US010073969B1

(12) United States Patent
Faibish et al.

(10) Patent No.: US 10,073,969 B1
(45) Date of Patent: Sep. 11, 2018

(54) FILE SYSTEM METADATA EXTENSION UTILIZABLE WITH OBJECT STORE

(71) Applicant: EMC Corporation, Hopkinton, MA (US)

(72) Inventors: Sorin Faibish, Newton, MA (US); Philippe Armangau, Acton, MA (US); John M. Bent, Los Alamos, NM (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 560 days.

(21) Appl. No.: 14/743,453

(22) Filed: Jun. 18, 2015

(51) Int. Cl.
*G06F 17/30* (2006.01)
*G06F 21/55* (2013.01)

(52) U.S. Cl.
CPC ...... *G06F 21/554* (2013.01); *G06F 17/30073* (2013.01); *G06F 17/30138* (2013.01); *G06F 17/30238* (2013.01)

(58) Field of Classification Search
CPC ......... G06F 17/30067; G06F 17/30902; G06F 17/30215; G06F 17/30575; G06F 17/3089
USPC ........................................ 707/203, 204, 205
See application file for complete search history.

(56) References Cited

U.S. PATENT DOCUMENTS

| | | | | |
|---|---|---|---|---|
| 7,873,619 B1* | 1/2011 | Faibish | ............. | G06F 17/30091 707/705 |
| 8,006,111 B1* | 8/2011 | Faibish | ................. | G06F 1/3221 711/114 |
| 8,099,572 B1* | 1/2012 | Arora | ...................... | G06F 13/28 707/640 |
| 8,407,191 B1* | 3/2013 | Nanda | ............... | G06F 17/30156 707/654 |
| 8,442,952 B1* | 5/2013 | Armangau | ........ | G06F 17/30159 706/14 |
| 8,510,265 B1* | 8/2013 | Boone | ................... | G06F 17/302 707/609 |
| 2012/0096059 A1* | 4/2012 | Shimizu | .................. | G06F 3/061 707/828 |

OTHER PUBLICATIONS

J. Bent et al, "PLFS: A Checkpoint Filesystem for Parallel Applications;" ACM Proceedings of the Conference on High Performance Computing Networking, Storage and Analysis (SC09), Nov. 2009, pp. 1-12.

(Continued)

*Primary Examiner* — Monica Pyo
(74) *Attorney, Agent, or Firm* — Ryan, Mason & Lewis, LLP

(57) ABSTRACT

An apparatus comprises an object store, back-end storage supporting the object store, and a file system associated with the back-end storage. Objects of the object store are mapped to files of the file system. The file system is configured to provide file system metadata extensions for respective ones of the files, with the file system metadata extension for a given one of the files comprising a plurality of sets of attributes characterizing respective ones of a plurality of accesses to the given file. The file system metadata extension for the given one of the files may be updated responsive to each of the plurality of accesses to that file to incorporate a corresponding one of the sets of attributes. Each of the sets of attributes may comprise, for example, at least one time-based attribute and at least one data integrity check attribute.

20 Claims, 5 Drawing Sheets

(56) References Cited

OTHER PUBLICATIONS

Cluster File Systems, Inc., "Lustre: A Scalable, High-Performance File System," Nov. 2002, pp. 1-13.
F. Wang et al., "Understanding Lustre Filesystem Internals," National Center for Computational Sciences, Tech Report ORNL/TM-2009/117, Apr. 2009, pp. 1-80.
U.S. Appl. No. 14/138,297 filed in the name of S. Faibish et al. on Dec. 23, 2013 and entitled "Cluster File System Comprising Data Mover Module Arranged Between Front-End and Back-End File Systems."
U.S. Appl. No. 14/499,429 filed in the name of S. Faibish et al. on Sep. 29, 2014 and entitled "Cluster File System Comprising Data Mover Modules Having Associated Quota Manager for Managing Back-End User Quotas."

\* cited by examiner

STRUCTURE OF EXTENDED METADATA FOR A
FILE MAPPING AN OBJECT ON A FILE SYSTEM

FILE SYSTEM METADATA EXTENSION UTILIZABLE WITH OBJECT STORE

FIELD

The field relates generally to information processing systems, and more particularly to information processing systems that incorporate object stores.

BACKGROUND

In an object store, data is exposed and managed in the form of objects instead of files or blocks. Different objects can include different amounts and types of unstructured data but each object is identified by a globally unique identifier. Objects can therefore be stored in a flat address space such as a storage pool. The unique identifier of a given object allows an application or other requesting entity to retrieve that object without needing to know the physical location in which the object is stored. Accordingly, object stores abstract away complexities associated with lower level storage functions.

Object stores are often utilized in cloud storage environments. Examples of cloud-based object stores include Amazon Web Services (AWS) Simple Storage Service (S3), Google Cloud Platform (GCP) Cloud Storage, and Microsoft Azure Blob Storage.

SUMMARY

We have determined that object stores implemented in cloud storage environments and other types of information processing systems can be problematic in certain situations. For example, in an object store in which objects are each mapped to one or more files of a file system associated with back-end storage, if an attacker tampers with a given such file, it can be difficult under conventional practice to detect the tampering itself as well as the particular conditions under which the tampering occurred, and to recover from the corresponding data corruption. The user may therefore only become aware of the data corruption after an attempt to retrieve and utilize the object ends in failure.

Illustrative embodiments of the present invention address these and other issues by providing information processing systems that implement an object store, back-end storage and a file system with metadata extensions, so as to provide significant improvements relative to conventional arrangements.

In one embodiment, an apparatus comprises an object store, back-end storage supporting the object store, and a file system associated with the back-end storage. Objects of the object store are mapped to files of the file system. The file system is configured to provide file system metadata extensions for respective ones of the files, with the file system metadata extension for a given one of the files comprising a plurality of sets of attributes characterizing respective ones of a plurality of accesses to the given file. The apparatus is illustratively implemented in an information processing system.

The file system metadata extension for the given one of the files may be updated responsive to each of the plurality of accesses to the given file to incorporate a corresponding one of the sets of attributes. Each of the sets of attributes may comprise, for example, at least one time-based attribute and at least one data integrity check attribute associated with the corresponding access to the given file. The time-based attribute may comprise one or more of an access time of the given file and a modification time of the given file, and the data integrity check attribute may comprise a checksum computed for the given file in conjunction with the access to the given file. For example, the checksum may be computed by the file system responsive to closing of the given file after the access to the given file.

The file system metadata extension for the given one of the files can be identified at least in part by at least one pointer inserted in an index node of the given file. For example, the file system metadata extension for the given one of the files may comprise a stub identified by a pointer inserted in the index node of the given file. In such an arrangement, the stub is illustratively configured to point to the given file and to record the sets of attributes associated with respective accesses to the given file. The stub can also support other functionality. For example, the stub can be used to control access to the given file, and can be configured such that only trusted applications are permitted to access the given file.

In some embodiments, the file system metadata extension for a given one of the files comprises a plurality of sets of keyed attributes stored in key-value storage. For example, the given file system metadata extension may comprise sets of keyed attributes each including at least one key-value pair of a key-value store, with the key comprising a time-based attribute and the value comprising a data integrity check attribute.

As noted above, illustrative embodiments described herein provide significant improvements relative to conventional arrangements. For example, one or more such embodiments configure the file system metadata extensions so as to provide an ability to detect data integrity issues such as data tampering. Moreover, responsive to detection of a data integrity issue, recovery of the object from a replica of the given file is facilitated using the corresponding file system metadata extension.

Illustrative embodiments include, without limitation, methods, apparatus, systems, and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing or storage systems, as well as other types of processing systems comprising physical and/or virtual processing resources.

Figure 1:
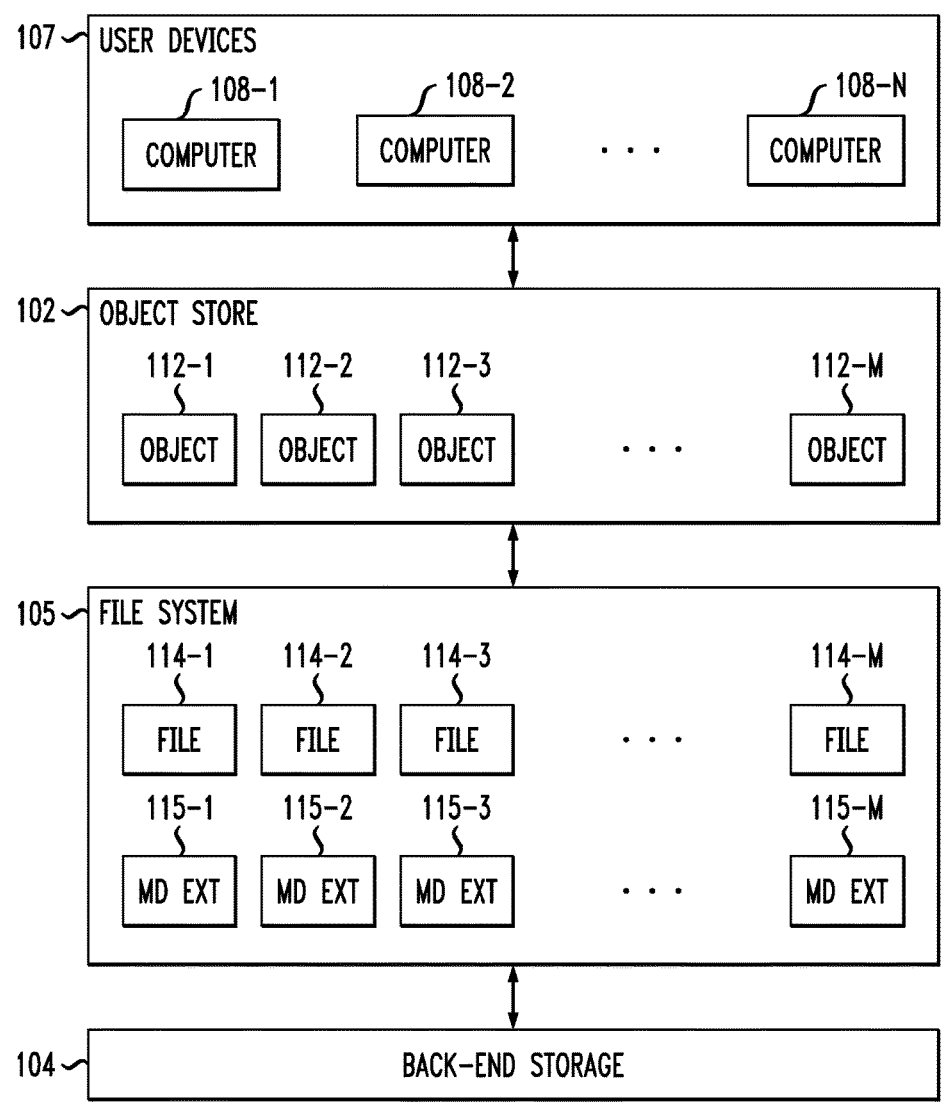
FIG. 1 is a block diagram of an information processing system comprising an object store, back-end storage and a file system with metadata extensions in an illustrative embodiment of the invention.

FIG. 1 shows an information processing system 100 configured in accordance with an illustrative embodiment of the present invention. The information processing system 100 comprises an object store 102, back-end storage 104 supporting the object store 102, and a file system 105 associated with the back-end storage 104.

The information processing system 100 further comprises a set of user devices 107 including respective computers 108-1, 108-2, . . . 108-N. The term "user" is intended to be broadly construed so as to encompass human, hardware, software or firmware entities, as well as combinations of such entities. Also, a "computer" as that term is broadly used herein may comprise, for example, a desktop, laptop or tablet computer, a mobile telephone, or other type of processing device. A given one of the computers 108 in the set of user devices 107 may alternatively comprise, for example, a virtual machine or container assigned to a particular user by a cloud provider.

The user devices 107 comprising computers 108 are illustratively shown as being coupled to the object store 102. At least a subset of the computers 108 may be viewed as examples of external hosts within the system 100.

In some embodiments, applications running on the computers 108 cannot directly access the file system 105. Instead, one or more object servers of the object store 102 are configured to interact with the file system 105 on behalf of such applications. In an arrangement of this type, files of the file system 105 are effectively hidden from the computers 108. Administrator passwords or other security measures may be used to ensure that files of the file system 105 are accessible to the object servers of the object store 102 but not accessible to the computers 108. Numerous alternative arrangements are possible in other embodiments. For example, in other embodiments, certain applications may be permitted limited access to parts of the file system 105 under specified conditions.

In the system 100, objects 112 of the object store 102 are mapped to files 114 of the file system 105. The file system 105 is configured to provide file system metadata extensions 115 for respective ones of the files 114. The file system metadata extensions 115 are each denoted in the figure using the notation "MD EXT." In this embodiment, it is assumed that there is a one-to-one mapping between the objects 112 and the files 114, although this is for clarity and simplicity of illustration only, and in other embodiments one or more objects could each be mapped to multiple files.

The assumed one-to-one mapping in the FIG. 1 embodiment more particularly maps objects 112-1, 112-2, 112-3, . . . 112-M to respective files 114-1, 114-2, 114-3, . . . 114-M. Also, file system metadata extensions 115-1, 115-2, 115-3, . . . 115-M are provided by the file system 105 for respective ones of the files 114.

In this embodiment, the file system metadata extension for a given one of the files comprises a plurality of sets of attributes characterizing respective ones of a plurality of accesses to the given file. For example, the file system metadata extension for the given one of the files may be updated responsive to each of the plurality of accesses to the given file to incorporate a corresponding one of the sets of attributes.

The file system metadata extension for the given file is assumed in the present embodiment to be associated with additional information in the form of conventional metadata that is maintained for the given file. Such conventional metadata is well understood by those skilled in the art and therefore not described in detail herein.

Each of the sets of attributes of the file system metadata extension for the given file comprises at least one time-based attribute and at least one data integrity check attribute associated with the corresponding access to the given file. The time-based attributes illustratively include access time ("atime") and modification time ("mtime") of the given file, and the data integrity check attribute illustratively comprises a checksum computed for the given file in conjunction with the access to the given file. Such a checksum can be computed, for example, by the file system 105 responsive to closing of the given file after the access to the given file, or responsive to one or more other conditions relating to the given file.

Accordingly, the file system metadata extension maintained for a given file in some embodiments effectively stores a complete access history of the corresponding object as well as information that can be used to verify data integrity and to facilitate recovery from any data integrity issues.

The file system metadata extensions 115 in some embodiments are implemented in the form of respective pluralities of sets of keyed attributes stored utilizing key-value storage. An example of such an arrangement will be described in more detail below in conjunction with FIGS. 3A and 3B. Other embodiments can utilize other types of arrangements for implementation and storage of file system metadata extensions.

The file system 105 can generate and process the metadata extension for the given file at least in part through the use of file system operations such as get attribute ("getattr") and set attribute ("setattr"). Such operations are utilized for respective reading and modification of particular attributes in the sets of attributes of the file system metadata extension, although additional or alternative operations can be used.

Other types of time-based attributes, data integrity check attributes or additional or alternative attributes can be used in the multiple sets of attributes of a file system metadata extension in other embodiments.

The file system metadata extensions 115 in the present embodiment illustratively comprise multiple sets of attributes characterizing respective ones of multiple accesses to the given file. Such extensions can provide significant advantages in an object store in which objects are mapped to files of a file system.

As mentioned previously, conventional arrangements are problematic in that it can be difficult to detect and recover from tampering attacks on objects stored in an object store. For example, conventional arrangements fail to provide adequate tracking of access history of an object in a manner that can facilitate a determination that a particular access may be attributable to an attacker. Conventional arrangements therefore cannot readily detect tampering or other data integrity issues involving a stored object. Such arrangements do not provide an efficient mechanism for determining when the data corruption occurred or which of multiple available replicas may be used for recovery. Conventional object stores in which objects are mapped to files of a file system are therefore unable to detect and recover from tampering with the files. More particularly, if data in an underlying file is corrupted, there is no reliable way for the object store to detect such corruption.

The system 100 is advantageously configured to overcome these and other problems of conventional practice by utilizing the file system metadata extensions to detect tampering or other data integrity issues involving a given file that is mapped to an object of an object store and to recover the object from a replica of the given file. Additional or alternative functionality based at least in part on the file system metadata extensions can provide other advantages over conventional arrangements.

The back-end storage 104 in some embodiments illustratively comprises storage arrays, storage disks, block devices or other types of storage devices. The files 114 of the file system 105 are mapped to these storage devices of the back-end storage.

By way of example, at least portions of the back-end storage 104 can comprise one or more scale-out network-attached storage (NAS) clusters. Such clusters may be implemented, for example, using Isilon® storage platforms, such as storage platforms comprising Isilon® platform nodes and associated accelerators in the S-Series, X-Series and NL-Series product lines, commercially available from EMC Corporation of Hopkinton, Mass.

Additional or alternative storage products that may be used to implement at least portions of the back-end storage 104 include storage arrays such as VNX® and Symmetrix VMAX®, both also commercially available from EMC Corporation.

A wide variety of other storage products may be utilized to implement at least portions of the back-end storage 104, including ViPR® Software-Defined Storage (SDS) from EMC Corporation.

Figure 3A:
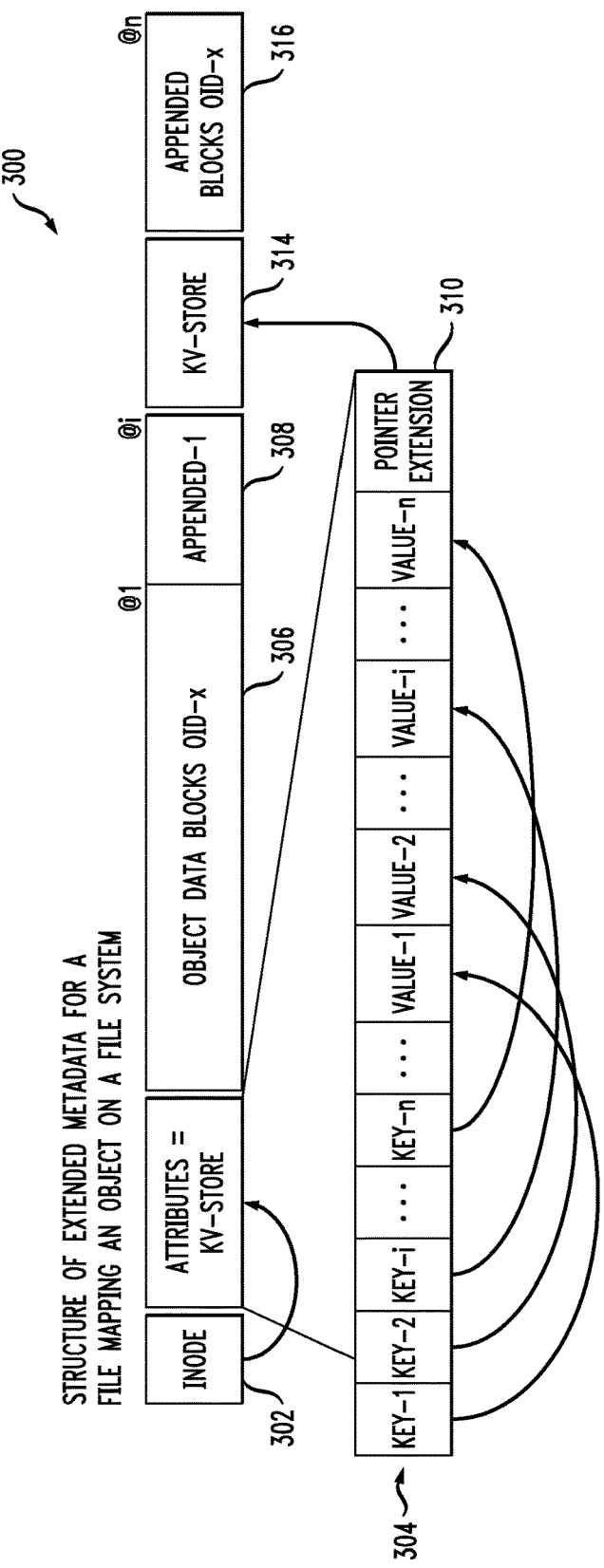
FIGS. 3A and 3B illustrate one possible implementation of a file system metadata extension comprising a plurality of sets of keyed attributes stored in key-value storage.
Figure 3B:
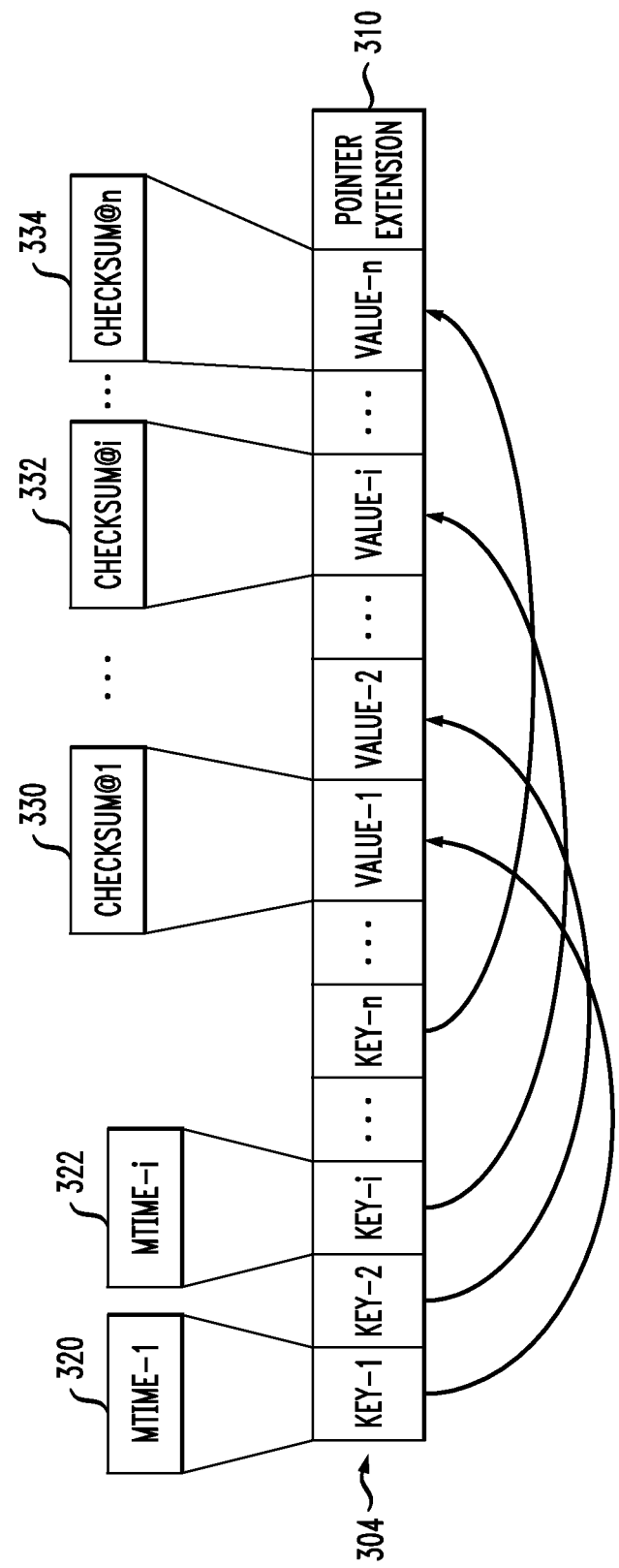

At least a portion of the back-end storage 104 in some embodiments comprises key-value storage for storing file system metadata extensions as respective pluralities of sets of keyed attributes, as in the example of FIGS. 3A and 3B. In an arrangement of this type, each set of keyed attributes may comprise one or more key-value pairs.

The file system 105 can be implemented utilizing any of a variety of different file systems, including Lustre, Hadoop Distributed File System (HDFS), Unix File System (UFS), General Parallel File System (GPFS), Network File System (NFS), PanFS and numerous others, as well as combinations of multiple such file systems.

By way of example, the objects 112 can be mapped to respective files 114 in a local file system running on a Linux server or set of servers. There may be multiple replica files stored in the local file system for each file that maps to one of the objects.

As another example, in an embodiment based on HDFS, a given one of the objects 112 may be mapped to multiple replicas of a given corresponding file in an ext4 file system. An arrangement of this type can further include an HDFS client that runs on the same server or other processing device that supports the file system, such that the HDFS client has local accessibility to each of the replicas of the given file.

Other file system arrangements can be configured to provide multiple replicas of a given file that maps to an object of an object store and to support recovery of the object using a given one of the replicas as selected based at least in part on the file system metadata extension of the given file.

Accordingly, it is apparent that numerous alternative types and arrangements of file systems can be used in implementing a given embodiment.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the object store 102, the back-end storage 104, the file system 105 and the user devices 107 comprising computers 108 may be implemented using one or more processing platforms, examples of which will be described in greater detail below in conjunction with FIGS. 4 and 5. A given such processing platform comprises at least one processing device comprising a processor coupled to a memory, and the processing device may be implemented at least in part utilizing one or more virtual machines or other types of virtualization infrastructure such as Docker containers or other types of containers.

It is to be appreciated that a given embodiment of the information processing system 100 may include multiple instances of the object store 102, the back-end storage 104 and the file system 105, although only a single instance of each of these elements is shown in the system diagram for clarity and simplicity of illustration.

It should also be understood that the particular set of components implemented in the information processing system 100 as illustrated in FIG. 1 is presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 206, and is suitable for use in the system 100 but is more generally applicable to other information processing systems comprising an object store, back-end storage and a file system with metadata extensions.

In step 200, an object store is configured in an information processing system. The object store is supported by back-end storage having an associated file system. With reference to the FIG. 1 embodiment, the object store 102 is supported by back-end storage 104 having an associated file system 105. The object store 102 is accessible to user devices 107 including computers 108 and possibly other processing devices. In some embodiments, one or more such devices may also be able to access the file system 105 via one or more application programming interfaces (APIs) under specified conditions.

In step 202, objects of the object store are mapped to files of the file system. In the context of the FIG. 1 embodiment, a one-to-one mapping is utilized between objects 112 and respective files 114 of the file system 105, although other embodiments can map each of one or more of the objects to multiple files of the file system 105. As another example, multiple objects can be mapped to a single file. These and other different types of object-to-file mappings can be implemented by the file system 105.

In step 204, file system metadata extensions are provided for respective ones of the files, illustratively by the file system 105 in the FIG. 1 embodiment. The file system metadata extension for a given one of the files comprises a plurality of sets of attributes characterizing respective ones of a plurality of accesses to the given file. For example, the file system metadata extension for the given one of the files may be updated responsive to each of the plurality of accesses to the given file to incorporate a corresponding one of the sets of attributes. The file system metadata extensions for the remaining files are each configured in a similar manner so as to characterize multiple accesses to the corresponding file.

As noted above, each of the sets of attributes of the file system metadata extension for the given file comprises at least one time-based attribute and at least one data integrity check attribute associated with the corresponding access to the given file. The time-based attributes illustratively include access time ("atime") and modification time ("mtime") of the given file, and the data integrity check attribute illustratively comprises a checksum computed for the given file in conjunction with the access to the given file. Such a checksum can be computed, for example, by the file system 105 responsive to closing of the given file after the access to the given file, or responsive to one or more other conditions relating to the given file.

The file system metadata extension maintained for a given file in some embodiments therefore effectively stores a complete access history of the corresponding object as well as information that can be used to verify data integrity and to facilitate recovery from any data integrity issues.

In step 206, the file system metadata extension for the given one of the files is utilized to detect if the corresponding object has been tampered with, and responsive to such detection of tampering, to recover the object using a replica of the given file.

Figure 2:
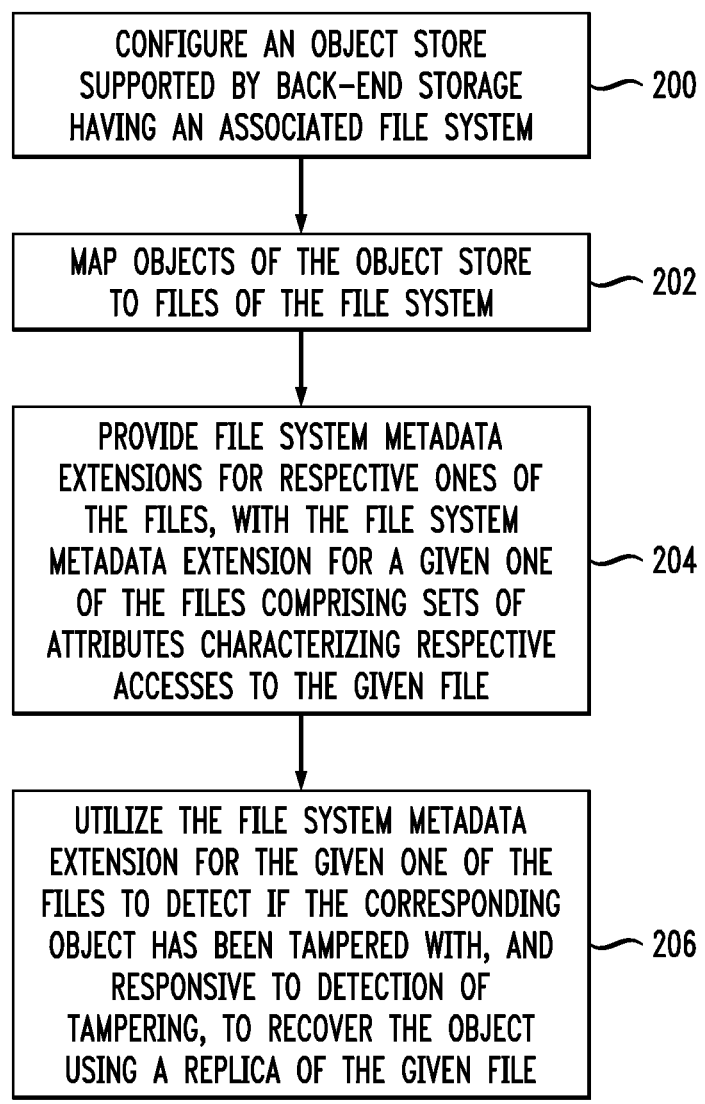
FIG. 2 is a flow diagram of an exemplary process implemented using the file system metadata extensions in the information processing system of FIG. 1.

In some implementations of the FIG. 2 process, the file system metadata extension for the given one of the files is identified at least in part by at least one pointer inserted in an index node ("inode") of the given file. The file system metadata extension in such an arrangement may be viewed as an extension to the index node containing metadata of the given file. An additional set of attributes is illustratively added to the file system metadata extension each time the given file is accessed, indicating for example the access time or modification time as well as a corresponding checksum.

In one or more embodiments, an application can read the sets of attributes from the file system metadata extension in conjunction with a current access to the object. Modification of the attributes may be limited to the file system 105. As mentioned previously, such modification may be performed at least in part utilizing a set attribute ("setattr") operation, although additional or alternative operations can be used.

As a more particular example, the file system metadata extension for the given one of the files may comprise a stub identified by a pointer inserted in the index node of the given file. The stub illustratively points to the given file and records the sets of attributes associated with respective accesses to the given file. The stub in some embodiments can be configured to comprise a file system link to another file location.

In addition, the stub can be used to control access to the given file and its associated file system metadata extension. For example, the stub may be configured such that only trusted applications running on designated ones of the computers 108 are permitted to access the given file and its associated file system metadata extension.

In an arrangement of this type, the stub can be used to effectively hide the given file from an attacker such that the attacker cannot modify or otherwise corrupt the data. Moreover, modification of the stub itself can be limited to the file system 105. As a result, the attacker cannot modify the stub or the given file pointed to by the stub.

An application that is permitted by the stub to access the file system metadata extension can obtain the sets of attributes characterizing respective accesses to the corresponding file, including the checksum computed in conjunction with each such access.

In some implementations of the FIG. 2 process, an application running on one of the computers 108 and accessing one or more objects of the object store 102 can access the file system metadata extension of at least one corresponding file via an API of the file system 105.

For example, the file system 105 can be configured to include an API that will allow the application to obtain the access history of the file from the corresponding file system metadata extension and to verify the data integrity of the file by utilizing the checksum from the file system metadata extension.

Moreover, the application can determine which of a plurality of accesses led to a change in the checksum. This can further help to facilitate a determination as to which of a number of available replicas of the file should be used to recover the object.

Such an API arrangement may be configured so as to ensure that the application is permitted read-only access to the file system metadata extension but only the file system 105 can modify the file system metadata extension.

The file system metadata extensions are utilized in the FIG. 2 process to detect tampering with objects and to recover objects for which such tampering has been detected. For example, as indicated in step 206, the file system metadata extension for a given one of the files is utilized to detect if a corresponding object has been tampered with and responsive to such detection of tampering to recover the object using a replica of the given file.

This object tampering detection and object file recovery can be implemented at least in part utilizing a virtual machine that processes the file system metadata extension of the given file on behalf of a requesting application.

For example, a daemon or service running as a virtual machine inside a Linux operating system can be configured to process the file system metadata extension in order to perform all checks needed for detection of tampering. This may involve scanning the access history as captured by the sets of attributes of the file system metadata extension. In the event that tampering is detected, the daemon or service can automatically recover the object from a replica of the corresponding file.

In other embodiments, as described previously, a file system client can run on the same server or other processing device that supports the file system, such that the client has local accessibility to each of the replicas of the given file. Such an arrangement can be used to allow an application to obtain a given one of the replicas via the client.

Again, other file system arrangements can be configured to provide multiple replicas of a given file that maps to an object of an object store and to support recovery of the object using a given one of the replicas as selected based at least in part on the file system metadata extension of the given file. For example, several different local file systems can each store a different replica of the given file that maps to an object of the object store. An application then determines from the metadata extension the appropriate replica to use to recover an object and obtains that replica from the corresponding local file system.

It is to be noted that object tampering detection and associated object recovery are just examples of functionality that may be implemented using file system metadata extensions as disclosed herein.

The particular processing operations and other system functionality described in conjunction with the flow diagram of FIG. 2 are presented by way of illustrative example only, and should not be construed as limiting the scope of the invention in any way. Alternative embodiments can use other types of processing operations involving file system metadata extensions. For example, the ordering of the process steps may be varied in other embodiments, or certain steps may be performed concurrently with one another rather than serially. Also, one or more of the process steps may be repeated periodically for different processing instances, or performed in parallel with one another.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

As noted above, the file system metadata extensions 115 in some embodiments are implemented in the form of respective pluralities of sets of keyed attributes stored utilizing key-value storage, with each set comprising at least one key-value pair. An example of such an arrangement will now be described in more detail with reference to FIGS. 3A and 3B.

Referring initially to FIG. 3A, a file 300 comprises an inode 302 that includes a pointer to a file system metadata extension having a first group of keyed attributes 304. The file 300 further comprises object data blocks 306 for a particular object identifier (OID) denoted OID-x and appended blocks 308 also associated with OID-x.

The keyed attributes 304 in this example are assumed to be stored in a key-value (KV) store supported by the back-end storage 104. The keyed attributes 304 comprise a plurality of keys denoted key-1, key-2, key-i, . . . key-n, . . . having respective corresponding values denoted value-1, value-2, value-i, . . . value-n. The keyed attributes 304 therefore illustratively comprise a well-ordered sequence of key-value pairs. The keyed attributes 304 further comprise a pointer extension 310 that points to an additional group of keyed attributes 314 that is also assumed to be stored in the KV store. The file 300 as illustrated in FIG. 3A further comprises additional appended blocks 316 for OID-x.

In this embodiment, the file system metadata extension for the file 300 comprises first and second groups of keyed attributes 304 and 314, although additional groups could be included as needed to capture access history and related information. Also, it is possible in some implementations that the file system metadata extension could include only a single group of keyed attributes rather than two distinct groups as in the present example.

The FIG. 3A embodiment is an example of an arrangement in which the file system metadata extension for a given file is identified at least in part by at least one pointer inserted in the inode of the file.

Also, the term "set of attributes" as used herein is intended to be broadly construed. For example, a given key-value pair in one of the groups 304 or 314 of keyed attributes may illustratively comprise a set of attributes associated with a particular one of a plurality of accesses to the file 300. Accordingly, each of the groups 304 and 314 of keyed attributes may be viewed as comprising multiple sets of attributes associated with respective ones of a plurality of accesses to the file 300.

Referring now to FIG. 3B, a more detailed view of the keyed attributes 304 is shown. As illustrated, key-1 is associated with a modification time 320 also denoted as mtime-1, and key-i is associated with a modification time 322 also denoted as mtime-i. Key-n may be similarly associated with a modification time or an access time of the file 300, although such association is not explicitly illustrated in the figure. Also, as indicated previously, the keys denoted key-1, key-i, . . . key-n, . . . have respective corresponding values denoted value-1, value-i, . . . value-n, in accordance with the well-ordered sequence of key-value pairs. The values denoted value-1, value-i and value-n more particularly comprise respective checksum values 330, 332 and 334, also denoted as checksum@1, checksum@i and checksum@n, respectively. These checksums are computed in conjunction with respective ones of first, i-th and n-th accesses to the corresponding file 300.

The appended blocks 308 and 316 shown in FIG. 3A are illustratively associated with the respective i-th and n-th accesses. Accordingly, checksum@1 is computed over blocks 306, checksum@i is computed over blocks 306 and 308, and checksum@n is computed over blocks 306, 308 and 316.

In an embodiment in which the above-described keyed attributes arrangement is implemented in a 64-bit UFS (UFS64) file system, up to eight kilobytes (KB) can be used to store the keyed attributes for a given file, including any space required for management of the keyed attributes, such as space for on-disk headers. Additionally, such an implementation can utilize at least a portion of a di extattr member of a dinode64 structure.

Also, the file system can be configured to support operations such as setting a key-value pair of a file, getting a key-value pair of a file, enumerating the key-value pairs of a file, and erasing a key-value pair of a file.

The UFS64 implementation can leverage functionality associated with an Access Control List (ACL) database. For example, the file system metadata extensions based on keyed attributes can utilize a refactored and generic version of the ACL database, comprising a new class denoted UntypedRecordDatabase. The on-disk format of the ACL database can be retained through use of another instance of the UntypedRecordDatabase class. Through appropriate parameterization, the location and names of the database record and data files and the size of its in-memory cache can be specified. This allows use of a hidden directory for the file system metadata extensions, as well as avoidance of an in-memory cache.

It should be understood that the particular keyed attribute arrangement illustrated in FIGS. 3A and 3B is presented by way of example only, and other embodiments can utilize other types of arrangements for implementation and storage of file system metadata extensions.

A number of additional examples of possible implementations of information processing systems with object stores, back-end storage and file systems with metadata extensions will now be described.

Example 1

Assume that an application running in a cloud wants to access an object that is stored in an object store of that cloud. The application will first determine that the object is mapped to a file having a file system metadata extension of the type described previously. The application will read the sets of attributes from the file system metadata extension and will validate the data by comparing a current checksum in one of the sets of attributes to an initial checksum in a previous one of the sets of attributes. If the current checksum matches the initial checksum, the application will start an input-output operation directed to the file. If the current checksum does not match the initial checksum, the application will examine the access history of the file as reflected in the sets of attributes of the file system metadata extension, in order to determine the last access for which the corresponding checksum matched the initial checksum. The application can then utilize a replica associated with that last access in order to recover the given file and its corresponding object. Alternatively, it can use an initial replica associated with the initial checksum. It may also send a set attribute request to the file system requesting that the file system replace the given file with the appropriate replica.

Example 2

Assume again that an application running in a cloud wants to access an object that is stored in an object store of that cloud. The application will first determine that the object is mapped to a file having a file system metadata extension of the type described previously. In this example, it is further assumed that the file system metadata extension for the file comprises a stub identified by a pointer inserted in the index node of the file. The stub itself points to the actual file in another file location such that the actual file is effectively hidden from the application. The stub also identifies the sets of attributes associated with respective accesses to the actual file. The application reads the sets of attributes and validates the data by comparing a current checksum in one of the sets of attributes to an initial checksum in a previous one of the sets of attributes, as in the previous example. If the data validity check passes, the application requests access to the actual file. Otherwise, the application requests recovery of the corresponding object using an appropriate replica of the file.

The foregoing examples are illustrative only, and should not be viewed as limiting the scope of any particular embodiment in any way.

Illustrative embodiments provide a number of significant advantages relative to conventional arrangements. For example, one or more such embodiments are configured to utilize file system metadata extensions to allow an application running on a user device to detect tampering or other data integrity issues involving a given file that is mapped to an object of an object store and to recover the object from a replica of the given file. Additional or alternative functionality based at least in part on the file system metadata extensions can provide other advantages in other embodiments.

It is to be appreciated that the particular system arrangements and associated processing operations illustrated in FIGS. 1-3 are exemplary only, and numerous other arrangements may be used in other embodiments.

It was noted above that portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention.

Figure 4:
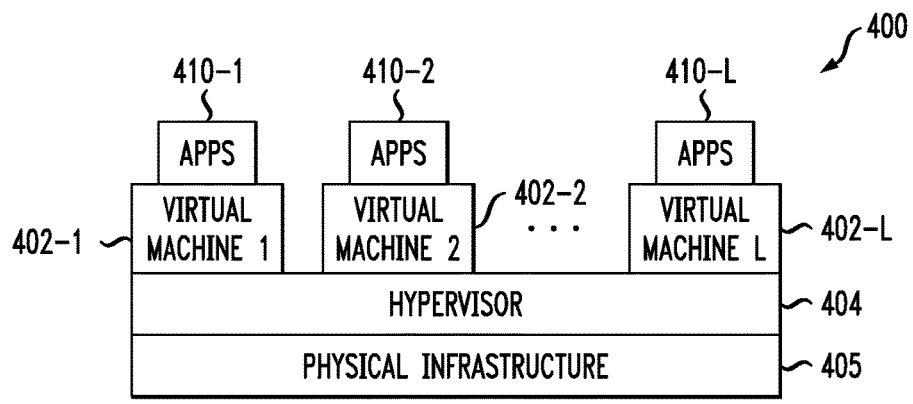
FIGS. 4 and 5 show examples of processing platforms that may be utilized to implement at least a portion of the system of FIG. 1.

As shown in FIG. 4, portions of the information processing system 100 may comprise cloud infrastructure 400. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 404 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device."

The cloud infrastructure 400 in FIG. 4 can additionally or alternatively be implemented using other types of virtualization techniques, such as Docker containers or other types of containers.

Figure 5:
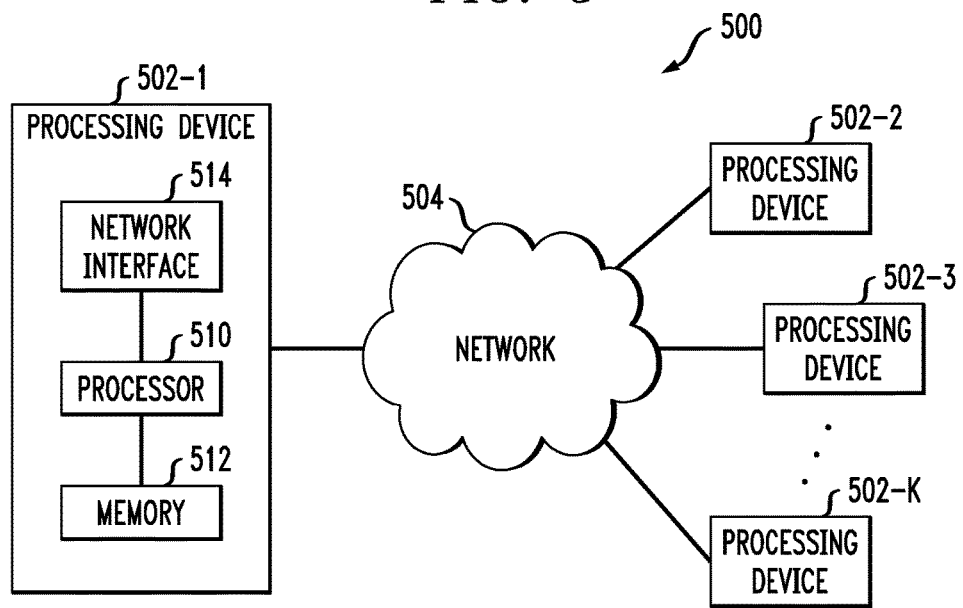

Another example of a processing platform suitable for use in some embodiments is processing platform 500 shown in FIG. 5. The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory, or other types of computer program products. The term "article of manufacture" as used herein should be understood to exclude transitory, propagating signals.

Also included in the processing device 502-1 is network interface circuitry 514, which is used to interface the processing device with the network 504 and other system components, and may comprise one or more conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, such as container-based virtualization infrastructure using Docker containers or other types of containers, in place of or in addition to virtualization infrastructure comprising virtual machines.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device such as one of the virtual machines 402 or one of the processing devices 502. For example, at least portions of the file system 105 and related functionality for generating and processing the file system metadata extensions 115 in the FIG. 1 embodiment are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems, object stores, file systems, back-end storage and user devices that can benefit from the use of file system metadata extensions as disclosed herein. Also, the particular configurations of system and device elements shown in FIGS. 1 and 3-5 and the process operations shown in FIG. 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
an object store;
back-end storage supporting the object store; and
a file system associated with the back-end storage;
wherein objects of the object store are mapped to files of the file system;
wherein the file system is configured to provide file system metadata extensions for respective ones of the files, the file system metadata extension for a given one of the files comprising a plurality of sets of attributes characterizing respective ones of a plurality of accesses to the given file;
wherein at least one of the plurality of sets of attributes of the file system metadata extension for the given one of the files comprises at least one set of keyed attributes comprising at least one key-value pair in which the key comprises a time-based attribute and the value comprises a data integrity check attribute;
wherein the data integrity check attribute of the key-value pair of the set of keyed attributes of the file system metadata extension for the given one of the files is utilized to detect if a corresponding object has been tampered with;
wherein the file system metadata extension for the given one of the files is identified at least in part by at least one pointer inserted in an index node of the given file; and
wherein the apparatus is implemented using at least one processing device comprising a processor coupled to a memory.

2. The apparatus of claim 1 wherein the file system metadata extension for the given one of the files is updated responsive to each of the plurality of accesses to the given file to incorporate a corresponding one of the sets of attributes.

3. The apparatus of claim 1 wherein each of the sets of attributes comprises at least one time-based attribute and at least one data integrity check attribute associated with the corresponding access to the given file.

4. The apparatus of claim 3 wherein the time-based attribute comprises one or more of an access time of the given file and a modification time of the given file.

5. The apparatus of claim 3 wherein the data integrity check attribute comprises a checksum computed for the given file in conjunction with the access to the given file.

6. The apparatus of claim 5 wherein the checksum is computed by the file system responsive to closing of the given file after the access to the given file.

7. The apparatus of claim 1 wherein the file system metadata extension for the given one of the files comprises a stub identified by a pointer inserted in the index node of the given file.

8. The apparatus of claim 7 wherein the stub points to the given file and records the sets of attributes associated with respective accesses to the given file.

9. The apparatus of claim 7 wherein the stub controls access to the given file and is configured such that only trusted applications are permitted to access the given file.

10. The apparatus of claim 1 wherein an application accessing one or more objects of the object store can access the file system metadata extension of at least one corresponding file via an application programming interface of the file system.

11. The apparatus of claim 10 wherein the application can read the file system metadata extension but only the file system can modify the file system metadata extension.

12. The apparatus of claim 1 wherein the file system is further configured, responsive to detection of tampering with the corresponding object, to recover the object using a replica of the given file.

13. The apparatus of claim 12 wherein the object tampering detection and object file recovery are implemented at least in part utilizing a virtual machine that processes the file system metadata extension of the given file on behalf of a requesting application.

14. An information processing system comprising the apparatus of claim 1.

15. A method comprising:
configuring an object store supported by back-end storage having an associated file system;
mapping objects of the object store to files of the file system; and
providing file system metadata extensions for respective ones of the files;
wherein the file system metadata extension for a given one of the files comprises a plurality of sets of attributes characterizing respective ones of a plurality of accesses to the given file;
wherein at least one of the plurality of sets of attributes of the file system metadata extension for the given one of the files comprises at least one set of keyed attributes comprising at least one key-value pair in which the key comprises a time-based attribute and the value comprises a data integrity check attribute;
wherein the data integrity check attribute of the key-value pair of the set of keyed attributes of the file system metadata extension for the given one of the files is utilized to detect if a corresponding object has been tampered with;
wherein the file system metadata extension for the given one of the files is identified at least in part by at least one pointer inserted in an index node of the given file; and
wherein the configuring, mapping and providing are implemented using at least one processing device comprising a processor coupled to a memory.

16. The method of claim 15 further comprising:
responsive to detection of tampering with the corresponding object, recovering the object using a replica of the given file.

17. A non-transitory processor-readable storage medium having stored therein program code of one or more software programs, wherein the program code when executed by at least one processing device causes said processing device:
to configure an object store supported by back-end storage having an associated file system;
to map objects of the object store to files of the file system; and
to provide file system metadata extensions for respective ones of the files;
wherein the file system metadata extension for a given one of the files comprises a plurality of sets of attributes characterizing respective ones of a plurality of accesses to the given file;
wherein at least one of the plurality of sets of attributes of the file system metadata extension for the given one of the files comprises at least one set of keyed attributes comprising at least one key-value pair in which the key comprises a time-based attribute and the value comprises a data integrity check attribute;
wherein the data integrity check attribute of the key-value pair of the set of keyed attributes of the file system metadata extension for the given one of the files is utilized to detect if a corresponding object has been tampered with; and
wherein the file system metadata extension for the given one of the files is identified at least in part by at least one pointer inserted in an index node of the given file.

18. The non-transitory processor-readable storage medium of claim 17 wherein the file system metadata extension for the given one of the files comprises a stub identified by a pointer inserted in the index node of the given file.

19. The non-transitory processor-readable storage medium of claim 18 wherein the stub points to the given file and records the sets of attributes associated with respective accesses to the given file.

20. The non-transitory processor-readable storage medium of claim 18 wherein the stub controls access to the given file and is configured such that only trusted applications are permitted to access the given file.

* * * * *